Patented July 4, 1933

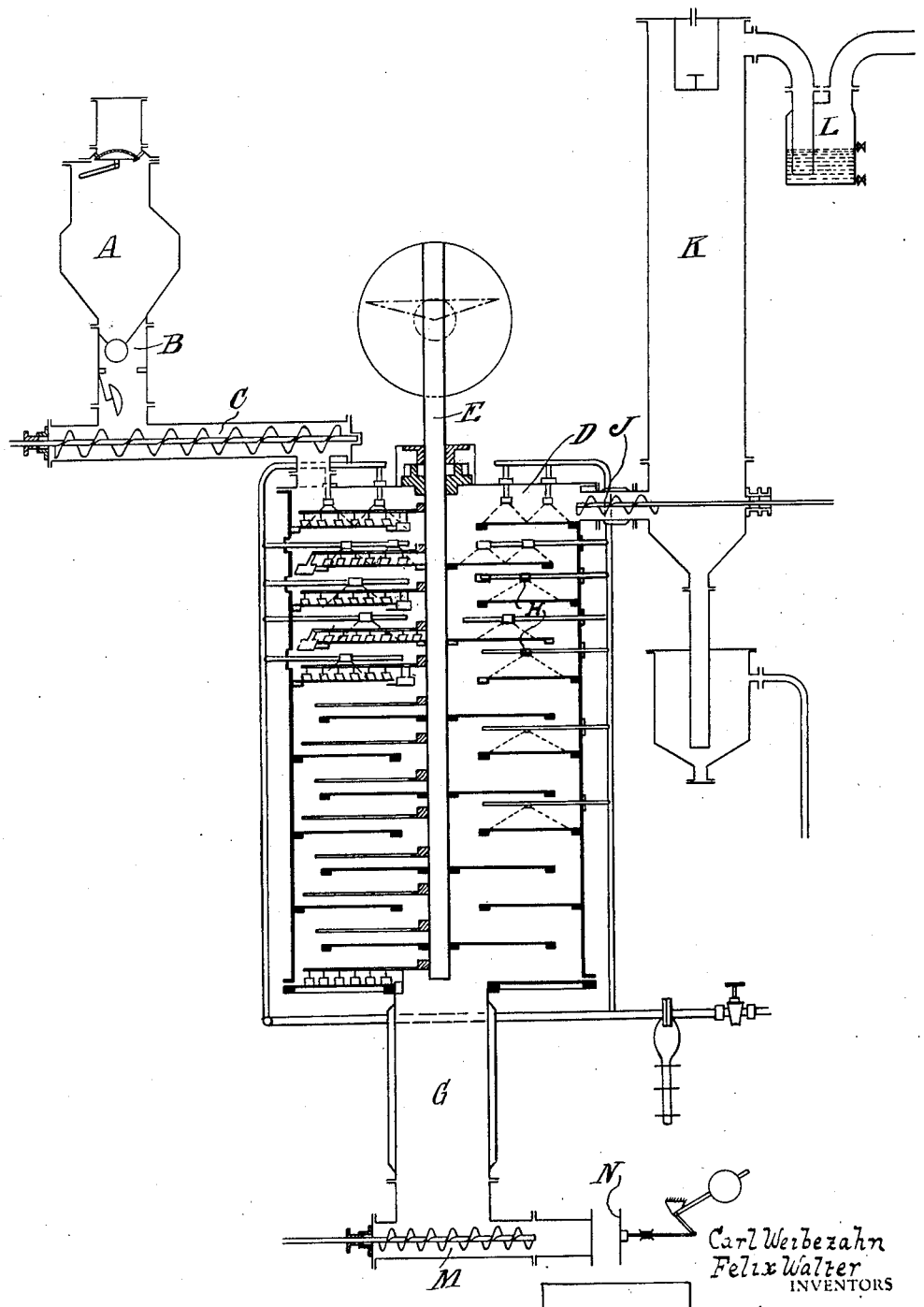

1,916,592

UNITED STATES PATENT OFFICE

CARL WEIBEZAHN AND FELIX WALTER, OF KNAPSACK, NEAR COLOGNE-ON-THE-RHINE, GERMANY, ASSIGNORS TO AKTIENGESELLSCHAFT FÜR STICKSTOFFDÜNGER, OF COLOGNE-ON-THE-RHINE, GERMANY, A CORPORATION

PROCESS OF PREPARING ACETYLENE     REISSUED

Application filed February 8, 1929, Serial No. 338,433, and in Germany February 14, 1928.

The present invention relates to a process of preparing acetylene and apparatus therefor.

It is generally known that in the manufacture of acetylene from calcium carbide the removal of heat evolved during the process is of great importance, because high temperature causes loss of material and danger in working; for this reason the calcium carbide is introduced into 7–10 times its weight of water, and this mode of procedure is officially prescribed for industrial carbide gas producers. Apart from certain losses caused by the use of such a relatively large quantity of water, the said procedure has the special disadvantage that the calcium hydroxide which is formed is obtained in a state of mud, which renders its industrial utilization difficult; in certain cases the hydroxide even constitutes a cumbersome waste product. Numerous attempts have been made to reduce the proportion of water to be used in producing gas from the calcium carbide without loss of material or danger in working. It has been proposed to decompose the calcium carbide with a limited quantity of water in presence of calcium hydroxide powder, the calcium carbide being brought into contact with the calcium hydroxide while introducing such a quantity of water as will prevent an excessive and therefore injurious rise of temperature. However, attempts in this direction have not given the desired result because it has not been possible to absorb the heat evolved during the decomposition of the calcium carbide sufficiently to avoid a dangerous rise of temperature during the whole process.

The present invention relates to a simple method by which the problem in question may be solved. According to this method there is applied to the calcium carbide, while it is kept continuously in motion, so much water in a finely divided form, that there is present in addition to the amount theoretically required for producing the gas a further quantity as is sufficient to absorb the heat evolved without a dangerous rise of temperature. During the process care must be taken that, while the water is applied, the calcium carbide to be decomposed is simultaneously kept in motion, so that not only is the surface presented to the water continually changed and the calcium hydroxide produced kept uniformly mixed with the remaining calcium carbide but also the temperature is kept uniform throughout the mass by the movement. In this manner it is possible to absorb the heat, as it is produced, by converting water into steam at a temperature not exceeding 100° C., the steam escaping along with the acetylene evolved. Thus, a complete yield of acetylene can be produced from the calcium carbide without any danger, while there is simultaneously obtained a substantially dry calcium hydroxide.

In working the new process, it is not absolutely necessary to add the water in a finely divided form. For carrying out the process according to the invention, any one of the usual apparatus may be used which permits a continuous and thorough mixing of the calcium carbide and at the same time allows introduction of the water in a suitable form and removal of the acetylene and the calcium hydroxide produced. However, a generator, as shown in diagrammatic vertical section in the accompanying drawing, has proved to be very suitable, and constitutes a part of the invention.

The calcium carbide is conveyed from the storage vessel A to the generator D by means of a delivering device B and the screw conveyer C. In this generator is a number of fixed plates F arranged in steps, one above the other. By means of stirring arms carried by a vertical shaft E in the generator, the calcium carbide is caused to pass from plate to plate. The water is uniformly distributed over the calcium carbide by means of the nozzles H mounted above the plates. By the action of the stirring arms the mass is thoroughly mixed and thus everywhere a uniform temperature is obtained which rises at the most to 90° C. The temperature of the escaping acetylene, which is admixed with water vapor, should be controlled by thermometers placed in the uppermost, middle and lowermost part of the apparatus. The acetylene produced leaves the generator at J, where there is an endless screw device which prevents choking of the outlet pipe by any lime that may be carried along with the acetylene. The acetylene then passes through the cooler K and the washer L to the place of use. The substantially dry calcium hydroxide which falls into the chutes G is continuously removed by the conveyer M against the pressure of the weighted door N.

We claim:

1. The process for continuously producing acetylene and substantially dry calcium hydroxide from calcium carbide which comprises moistening a moving body comprising calcium carbide with water at a plurality of points along its path of movement while continuously agitating the constituents of the moving body, the amount of water employed being only that necessary to effect a conversion of the calcium carbide into acetylene and calcium hydroxide and a reduction of the heat of the reaction to below 100° C. by evaporation of a part of said water.

2. A process as in claim 1 wherein the moving body is given a step by step advance and water is sprayed thereon at each step.

3. The process for continuously producing acetylene and substantially dry calcium hydroxide from calcium carbide which comprises adding gradually, to the calcium carbide, such an amount of water in a finely divided form as is necessary to effect a conversion of the calcium carbide into acetylene and calcium hydroxide plus the amount which on vaporization is required to effect a reduction of the heat of the reaction to below 100° C.

In testimony whereof, we affix our signatures.

CARL WEIBEZAHN.
FELIX WALTER.